United States Patent [19]

Voelker et al.

[11] Patent Number: 5,494,616
[45] Date of Patent: Feb. 27, 1996

[54] PRODUCTION OF FIBERS BY CENTRIFUGAL SPINNING

[75] Inventors: Heinz Voelker, Limburgrhof; Hans D. Zettler, Gruenstadt; Wolfgang Fath, Hirschberg; Heinz Berbner, Moerlenbach, all of Germany

[73] Assignee: BASF Aktiengesellschaft, Ludwigshafen, Germany

[21] Appl. No.: 239,311

[22] Filed: May 6, 1994

[30] Foreign Application Priority Data

May 11, 1993 [DE] Germany .................. 43 15 609.6

[51] Int. Cl.[6] .................................................. D01D 5/18
[52] U.S. Cl. ................ 264/8; 264/211.1; 425/8; 425/72.2
[58] Field of Search ............... 264/8, 211.1; 425/8, 425/72.2

[56] References Cited

U.S. PATENT DOCUMENTS

| | | | |
|---|---|---|---|
| 3,249,657 | 5/1966 | Russo | 264/8 |
| 3,272,893 | 9/1966 | Mogensen | 425/8 |
| 3,446,877 | 5/1969 | Endler | 264/8 |
| 3,765,922 | 10/1973 | Chisholm | 264/8 |
| 4,059,372 | 11/1977 | Barannik et al. | 264/8 |
| 4,088,620 | 5/1978 | Nihongi | 260/29.4 |
| 4,178,336 | 12/1979 | Snowden | 264/8 |
| 4,303,433 | 12/1981 | Torobin | 425/8 |
| 4,473,697 | 9/1984 | Gonczi | 548/306 |
| 4,599,428 | 7/1986 | Gonczi | 548/306 |
| 4,684,336 | 8/1987 | Brotz | 425/8 |
| 4,996,289 | 2/1991 | Berbner | 528/230 |
| 5,066,430 | 11/1991 | Matthews | 264/8 |
| 5,084,488 | 1/1992 | Weiser | 521/187 |
| 5,232,638 | 8/1993 | Thiessen et al. | 264/6 |

FOREIGN PATENT DOCUMENTS

| | | |
|---|---|---|
| 017510 | 10/1980 | European Pat. Off. . |
| 019383 | 11/1980 | European Pat. Off. . |
| 221330 | 9/1985 | European Pat. Off. . |
| 93965 | 3/1988 | European Pat. Off. . |
| 4123050 | 1/1993 | Germany . |
| 1141201 | 1/1969 | United Kingdom . |
| 2093400 | 9/1982 | United Kingdom . |

*Primary Examiner*—Mary Lynn Theisen
*Attorney, Agent, or Firm*—Keil & Weinkauf

[57] ABSTRACT

A process for producing fibers by spinning a resin by a centrifugal spinning process comprises supplying a resin solution having a viscosity from 50 to 200 Pa.s at the spinning temperature to a whirler plate and ensuring that the resin solution is under a sufficient pressure to completely fill the nozzles of the whirler plate as the fibers are being spun. The process is particularly suitable for producing fibers based on amino resins. In the apparatus the supply line for the resin is preferably located within the driveshaft.

7 Claims, 1 Drawing Sheet

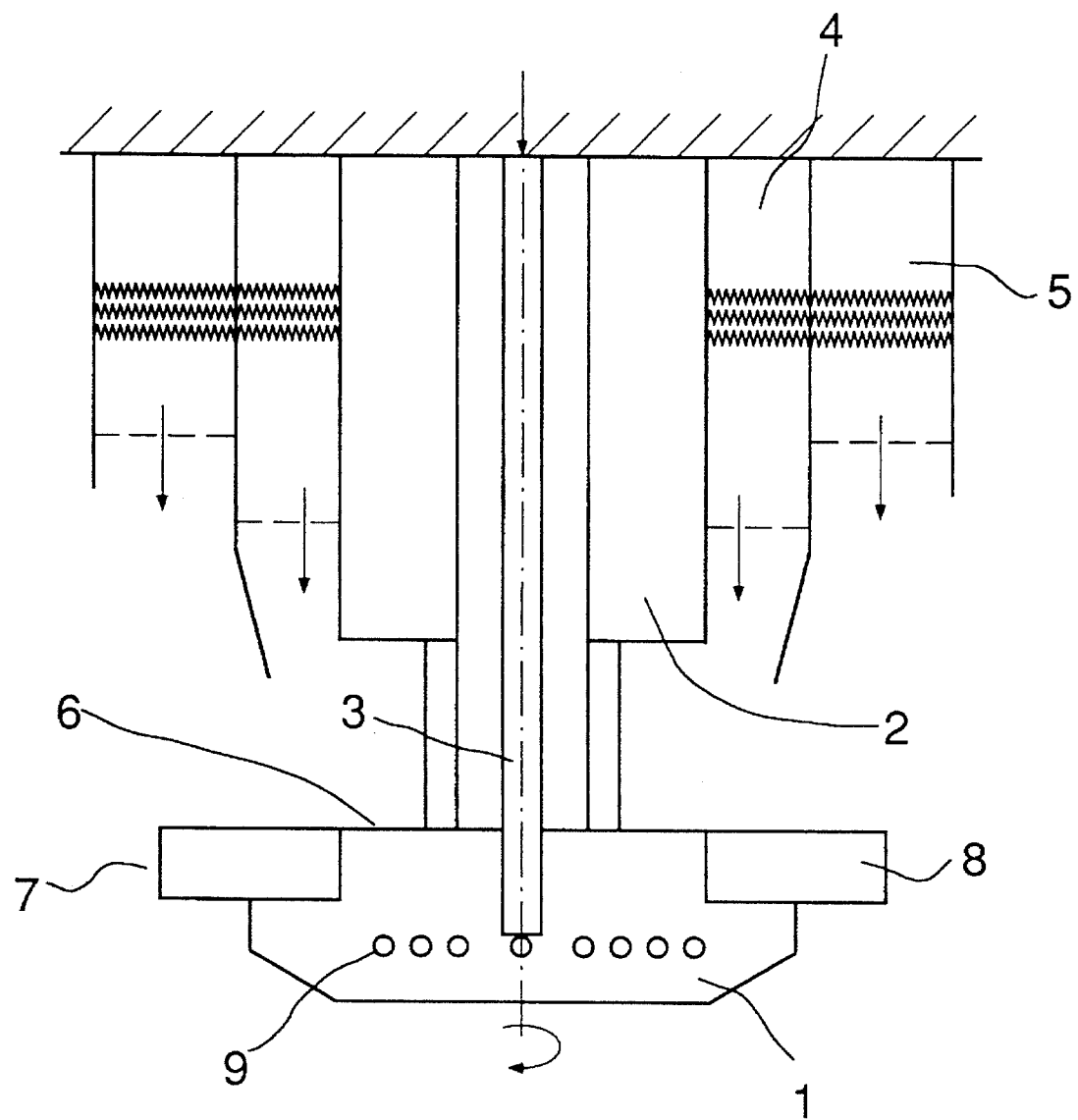

PRODUCTION OF FIBERS BY CENTRIFUGAL SPINNING

BACKGROUND OF THE INVENTION

1. Field of the Invention

The present invention relates to a process and apparatus for producing fibers by a centrifugal spinning process.

2. Description of the Prior Art

Various ways are known for producing fibers, in particular from amino resins.

GB-A-1 141 201 describes the production of fibers starting from a resin material which is introduced between surfaces of a pair of belts. The belt surfaces are then moved apart, which results in fibers being formed.

DE-A-2 364 091 describes a process for producing flame-resistant and thermally unmeltable melamine resin fibers wherein a solution of a melamine-aldehyde precondensate is spun into a heated atmosphere, evaporating the solvent and curing the precondensate.

DE-A-2 810 535 describes a process for producing fibers from a heat-curable formaldehyde resin by centrifugal spinning, wherein the fibers are formed cocurrently with cold, moist air. For this a stream of cold, moist air is deflected downward in the direction of the whirler drum in such a way that at least part of this air stream enters the whirler drum together with the mixture of resin and catalyst, so that the air stream counteracts any drying-out and reaction of the mixture as long as the latter is present in the whirler drum or plate. The fibers emerging from the whirler drum are entrained and attenuated by the cold, moist air stream. The attenuated fibers are then heated to 50°–100° C. and collected by a stream of hot, dry air flowing from underneath the whirler drum toward the outside.

These processes have a number of disadvantages. In some instances the spinning solutions have to have a very low viscosity. This produces very brittle, short fibers which cannot be used for web or fabric production. If, on the other hand, high viscosity solutions are used and spun at higher temperatures, it is found that the fiber-forming step is accompanied by considerable inter-fiber fusion and that the danger of jet collapse is considerable.

The process of DE-A-2 810 535, where cold, moist air is used, likewise gives rise to considerable inter-fiber fusion because of the long residence time in a moist atmosphere prior to drying. The fiber bundles are impossible to separate and lead to brittle, friable, thick fibers which are very difficult to process into webs and yarns.

In existing processes the fibers are formed from partly filled nozzles, i.e. the stream of resin from which the fibers are formed does not fill out the entire nozzle cross section as the fibers are being spun.

SUMMARY OF THE INVENTION

It is an object of the present invention to provide a process and apparatus for producing fibers by centrifugal spinning whereby in particular elastic, uniform, low flammability fibers having a high strength level can be obtained on the basis of melamine-formaldehyde resins and the aforementioned disadvantages are eliminated.

We have found that this object is achieved according to the invention by a process for producing fibers by spinning a resin by a centrifugal spinning process, which comprises supplying a resin solution having a viscosity from 50 to 200 Pa.s at the spinning temperature to a whirler plate and ensuring that inside the whirler plate the resin solution is under a sufficient pressure to completely fill the nozzles of the whirler plate as the fibers are being spun.

BRIEF DESCRIPTION OF THE DRAWING

The drawing schematically sets forth suitable apparatus for producing fibers by the centrifugal spinning process. The drawing depicts a supply line 3 for the resin, a whirler plate 1 and a driveshaft 2 for the whirler plate, wherein the supply line 3 for the resin is arranged in the driveshaft 2.

The process of the invention will now be illustrated with reference to the preferred apparatus for carrying out the process depicted in the drawing, where 1 is a whirler plate, 2 is a driveshaft for the whirler plate, 3 is a supply line for the resin solution, 4 and 5 are shafts for the supply of dry air arranged concentrically around the driveshaft, 6 is an overflow hole, 7 and 8 are wings attached to the whirler plate, and 9 is a nozzle.

In the process of the invention the fibers are spun from nozzles having a cross section completely filled with resin. This requires, in order that the pressure loss in the nozzle may be overcome, a pressure p upstream of the nozzle 9 in the whirler plate 1.

The spinning of fibers from nozzles having a cross section completely filled with resin is preferably effected at a pressure p on the resin from 10 to 80 bar, preferably from 20 to 70 bar, and particularly preferably from 30 to 55 bar. The pressure p upstream of the nozzles 9 in the whirler plate 1 is calculable according to the equation I $$P = 0.5 \cdot \rho \cdot v^2 \cdot \left[ 1 - \left( \frac{D_i}{D_e} \right)^2 \right] \quad \text{I}$$

from the density $\rho$ of the resin solution, the circumferential speed $v$ and the internal diameter $D_i$ and the external diameter $D_e$ of the whirler plate 1.

The pressure p inside the whirler plate 1 is generally the result of centrifugal forces. An equilibrium is established between the fill level and the mass flow through the nozzles as a function of the whirler plate geometry, the revolutions per minute and the material properties of the resin, chiefly density and viscosity.

The pressure p is preferably kept constant during the process.

The process of the invention is generally carried out using nozzles 9 having a diameter from 0.1 to 1 mm, preferably from 0.4 to 0.6 mm, a speed from 10,000 to 25,000 rpm, preferably from 16,000 to 20,000 rpm, and a viscosity from 50 to 200, preferably from 80 to 150, Pa.s for the resin solution inside the whirler plate (spinning solution). The specified viscosity is measured with a plate-cone viscometer at the spinning temperature.

Preferably the process of the invention is carried out with the presence in the surroundings of the whirler plate of dry air which, as the process is being carried out, is directed continuously via suitable supply means to the rotating whirler plate 1.

For this at least one dry air stream is passed from above the whirler plate 1 along the driveshaft 2 in the direction of the whirler plate 1 and away from there toward the outside.

The dry air to be used according to the invention generally has a temperature from 10° to 50° C., preferably from 25° to 35° C., and a humidity of less than 4 g of water/kg of air, preferably from 0 to 3 g of water/kg of air.

Preferably at least two dry air streams are passed through lines disposed at different distances from the driveshaft, the velocity of the air stream adjacent to the driveshaft being greater than the velocity of the air streams further away. Particularly preferably the air supply takes place via shafts 4 and 5, which are arranged concentrically in the direction of the whirler plate 1. The inner shaft 4 preferably has a conical taper at its lower end.

This way of guiding the dry air guarantees rapid drying of the fibers being formed and influences their flight in such a way that the fibers do not fuse or coalesce.

The flight of the fibers is further favorably affected when wings 7 and 8 are attached to the whirler plate 1. This is advantageous in particular in respect of the avoidance of fusion or coalescence.

The wings 7 and 8 attached to the whirler plate preferably have an area from 0.5 to 1.5 cm².

The air used for drying in the process of the invention can usefully be recirculated, in which case it is set to the desired humidity level in a conventional manner by means of suitable regenerable driers.

The air streams are preferably set in such a way that from 10 to 30 kg, preferably from 15 to 25 kg, of dry air are used per kg of fibers produced.

The process of the invention is carried out using an apparatus for producing fibers by centrifugal spinning that includes a supply line for the resin, a whirler plate and a driveshaft for the whirler plate.

In one embodiment of the process according to the invention, the resin solution is supplied to the whirler plate through a pipeline arranged alongside the driveshaft.

In a preferred embodiment of the invention, the resin is supplied via a duct (supply line 3) within the driveshaft 2.

Preferably the whirler plate 1 is completely closed except for the exit openings (nozzles 9) for the fibers to be spun, the supply line 3 and an overflow hole 6.

In a particularly preferred embodiment of the apparatus according to the invention, at least one shaft 4 or 5 for supplying the air is arranged above the whirler plate 1 and concentrically around the driveshaft 2.

In a particularly preferred embodiment, the whirler plate is equipped with wings 7 and 8 which each preferably have an area from 0.5 to 1.5 cm².

The resin used in the process of the invention is generally present in the form of an aqueous solution.

According to the invention, it is possible to use any thermosetting or thermoplastic resin which is processible into fibers by centrifugal spinning. Preferred resins are polyesters, polyamides, polyvinyl alcohols and amino resins. Particular preference is given to amino resins.

Amino resins according to the invention include for example the condensation products of urea, melamine, benzoguanamine, acetoguanamine, dicyandiamide, guanidine or thioureas with aldehydes, in particular with formaldehyde.

Preferred amino resins are urea and triazine resins. The triazine component of the triazine resins is selected for example from benzoguanamine, acetoguanamine and melamine.

Preference is given to using melamine resins. Particularly preferred melamine resins are the condensation products of melamine or melamine derivatives with formaldehyde, as described for example in EP-A-93 965, EP-A-221 330 and EP-A-408 947.

The process of the invention is particularly preferably carried out using melamine-formaldehyde precondensate solutions. These are described for example in EP-A-355 760.

The process of the invention is preferably carried out with aqueous condensation products of melamine and formaldehyde in which from 0.1 to 70 mol % of the melamine is replaced by melamine substituted by 1 to 3 hydroxyoxaalkyl groups of the formula $(CH_2—CH_2—O)_n—CH_2—CH_2—OH$ (n=1–5). Such condensation products are described in EP-A-408 947.

Furthermore, the melamine-formaldehyde resins may contain phenol groups. Such resins and their preparation by condensation are described in DE-A-4 123 050.

The amino resin fibers produced can contain fillers which can be added to the resins before spinning.

These fillers are generally fiber- or powder-form inorganic reinforcing agents or fillers, preferably with particle sizes less than 10 μm, such as glass fibers, metal powders, metal salts or silicates, e.g. kaolin, talc, baryte, quartz or chalk, also pigments and dyes and flame retardants.

The process and apparatus of the invention have numerous advantages.

For example, there is no need for the frequently necessary fiber formation aids such as polyethylene oxide or polyvinyl alcohol. They have the disadvantage of adversely affecting the flammability characteristics of the fibers.

The fibers produced by the process of the invention also have the advantage of a favorable length distribution and of a narrow fiber diameter distribution (preferably with an average diameter of 15 μm) coupled with high strength, minimal fusion and the absence of blisters.

The fibers produced by the process of the invention can be used for example for producing fiber mats as described in EP-B-80 655. However, the production of webs and fabrics is likewise advantageously possible.

EXAMPLE

Apparatus conforming to the drawing was used to produce elastic fibers based on a melamine-formaldehyde resin starting from a homogeneous aqueous solution analogously to Example 3(b) of EP-A-523 485 prepared from 1791.7 g (14.22 mol) of melamine, 626.1 g of an 80% strength by weight, aqueous solution of HOM (=isomer mixture from 10 mol % of S-hydroxy-3-oxapentylamino-1,3,5-triazine, 50 mol % of R'-(5-hydroxy-3-oxapentylamino)-1,3,5-triazine and 40 mol % of tris(5-hydroxy-3-oxapentylamino)-1,3,5-triazine) (1.52 mmol), 44.6 g (0.47 mol) of phenol, 557.9 g of paraformaldehyde, 7.0 g of 2-diethylamino-ethanol and 1093.9 g of 40% strength by weight aqueous formaldehyde solution and having a viscosity of 700 Pa.s at 24° C. Shortly before entry into the spinning apparatus 2% by weight, based on the aqueous solution, of 35% strength by weight formic acid were homogeneously mixed in as an acidic catalyst. This reduced the viscosity by about 30%. The density ρ of the spinning solution was 1.36 g/cm³. The whirler plate 1 had an external diameter $D_e$ of 120 mm and an internal diameter $D_i$ of 100 mm. Over its circumference it had 45 nozzles 0.5 mm in diameter in a uniform arrangement. The speed of the whirler plate was about 18,500 revolutions per minute. The total resin throughput was 17 kg per hour. The fibers were thus spun at a pressure of 68 bar. The spinning temperature was 28° C. The concentric shaft 4 supplied 120 kg/h of dry air and the other concentric shaft 5 supplied 80 kg/h of dry air. Said dry air had a temperature from 25° to 30° C. and a residual water content from 0 to 1 g of water/kg of air.

The fibers were collected on an endless belt and cured at from 180° to 220° C. in a continuous oven. The ready-produced fibers had a smooth surface and a textile hand.

Their tenacity was 3.5 cN/dtex and their elongation was 15%, measured on the line of DIN 53 816.

We claim:

1. A process for producing fibers by spinning a resin by a centrifugal spinning process, which comprises supplying a resin solution having a viscosity from 50 to 200 Pa.s at the spinning temperature to a whirler plate 1 and ensuring that inside the whirler plate (1) the resin solution is under a sufficient pressure to completely fill the nozzles of the whirler plate (1) as the fibers are being spun, and wherein the fibers are spun under a pressure p upstream of the nozzle (9) from 10 to 80 bar calculable by equation I $$P = 0.5 \cdot \rho \cdot v^2 \cdot \left[ 1 - \left( \frac{D_i}{D_e} \right)^2 \right] \quad \text{I}$$

from the density of the resin solution, the circumferential speed v and the internal diameter $D_i$ and the external diameter $D_e$ of the whirler plate (1).

2. A process as defined in claim 1 wherein the resin to be spun is supplied to the whirler plate 1 by a driveshaft (2).

3. A process as defined in claim 2 wherein at least one dry air stream is passed from above the whirler plate along the driveshaft (2) in the direction of the whirler plate (1).

4. A process as defined in claim 3 wherein at least two dry air streams are passed through lines disposed at different distances from the driveshaft, the velocity of the air stream adjacent to the driveshaft being greater than the velocity of the air streams further away.

5. Apparatus for producing fibers by a centrifugal spinning process, comprising a supply line (3) for the resin, a whirler plate (1) and a driveshaft (2) for the whirler plate (1), wherein the supply line (3) for the resin is arranged in the driveshaft (2), and wherein the upper openings of the whirler plate (1) are sealingly connected to the driveshaft (2) and in addition the whirler plate (1) is closed except for the exit openings (9) for the fibers to be spun and the overflow holes (6).

6. Apparatus as defined in claim 5 wherein at least one shaft (4) for supplying dry air is arranged above the whirler plate and concentrically around the driveshaft.

7. Apparatus for producing fibers by a centrifugal spinning process, comprising a supply line for the resin, a whirler plate and a driveshaft for the whirler plate, wherein the supply line for the resin extends alongside the driveshaft, and wherein the outer edge of the whirler plate is equipped with wings (7) and (8).

\* \* \* \* \*